United States Patent
Johnson et al.

[11] Patent Number: 6,135,248
[45] Date of Patent: *Oct. 24, 2000

[54] BRAKE DISK

[75] Inventors: Korey Johnson, West Allis; George H. Hinkens, Mequon; Glenn S. Metzelfeld, Brookfield, all of Wis.

[73] Assignee: Hayes Brake, Inc., Mequon, Wis.

[*] Notice: This patent is subject to a terminal disclaimer.

[21] Appl. No.: 09/211,903

[22] Filed: Dec. 15, 1998

Related U.S. Application Data

[63] Continuation-in-part of application No. 09/022,178, Feb. 11, 1998, Pat. No. 5,848,674, and a continuation-in-part of application No. 29/084,960, Mar. 13, 1998, and a continuation-in-part of application No. 29/084,979, Mar. 13, 1998, and a continuation-in-part of application No. 29/085,023, Mar. 13, 1998, said application No. 09/022,178, is a continuation of application No. 08/555,293, Nov. 8, 1995, abandoned.

[51] Int. Cl.$^7$ ..................................................... F16D 65/10
[52] U.S. Cl. ................................. 188/218 XL; 188/18 A
[58] Field of Search ........................... 188/18 A, 218 XL; 192/70.13

[56] References Cited

U.S. PATENT DOCUMENTS

| | | | |
|---|---|---|---|
| D. 352,020 | 11/1994 | Powers | D12/180 |
| 2,191,460 | 2/1940 | Fisher | 192/107 |
| 3,435,924 | 4/1969 | Beuchle | 188/218 |
| 3,621,945 | 11/1971 | Spry | 188/71.5 |
| 3,850,267 | 11/1974 | Odier | 188/71.6 |
| 4,077,501 | 3/1978 | Morris | 188/218 |
| 4,093,043 | 6/1978 | Smith | 188/73.6 |
| 4,273,218 | 6/1981 | Morris et al. | 188/18 |
| 4,848,521 | 7/1989 | Izumine | 188/18 |
| 4,913,267 | 4/1990 | Campbell et al. | 188/218 |
| 5,224,572 | 7/1993 | Smolen, Jr. et al. | 188/218 |
| 5,273,140 | 12/1993 | Berwanger | 188/73.1 |
| 5,848,674 | 12/1998 | Johnson et al. | 188/18 A |

OTHER PUBLICATIONS

Enduros BMW Motorrad, 1994 BMW Motorrad GmbH & Co., Munchen, Deutschland, 8 pages.
Aprilia, 1993 showing Pegaso motorcycles, 3 pages.
VT in Motorrad, Aug. 1993, p. 26.
BMW 34–0001 Parts Catalog, dated Jan. 1997, 2 pages.
Bassano Grimeca drawings of brake disks, dated 1983–1999, 38 pages.

*Primary Examiner*—Robert J. Oberleitner
*Assistant Examiner*—Xuan Lan Nguyen
*Attorney, Agent, or Firm*—Boyle Fredrickson Ziolkowski S.C.

[57] ABSTRACT

A brake disk has an inner annular portion or hub area and an outer annular portion or rub area that are interconnected by a number of spaced arms extending radially and circumferentially between the inner and outer annular portions. The arms can be formed (e.g. stamped) in a number of configurations, whereby the stress on the disk caused by the heat generated in the outer annular portion during braking is relieved by arm deflection, thus preventing warping of the disk. The arms are also configured to distribute stress relatively evenly throughout the arms during expansion and contraction of the outer annular portion, thereby preventing cracks and fractures.

26 Claims, 7 Drawing Sheets

BRAKE DISK

CROSS REFERENCE TO RELATED APPLICATIONS

This is a continuation-in-part of the following co-pending and commonly assigned patent applications all of which share at least one inventor and common subject matter with the present application: 1) U.S. patent application Ser. No. 09/022,178, filed Feb. 11, 1998 (which is a continuation of U.S. patent application Ser. No. 08/555,293, filed Nov. 8, 1995); 2) U.S. Design patent application Ser. No. 29/084,960, filed Mar. 13, 1998; 3) U.S. Design patent application Ser. No. 29/084,979, filed Mar. 13, 1998; and 4) U.S. Design patent application Ser. No. 29/085,023, filed Mar. 13, 1998. The complete disclosures of each of these applications is incorporated herein by reference.

BACKGROUND OF THE INVENTION

1. Field of the Invention

The present invention relates to a brake assembly for a vehicle such as motorcycle and more particularly to a brake disk having concentric rings interconnected by a number of heat responsive arms that flex to allow the outer ring to expand radially outwardly and inwardly with respect to the center of the disk.

2. Discussion of the Related Art

Solid one piece brake disks are generally used on motorcycles, bicycles, snowmobiles, and other vehicles. However, the disks tend to warp due to temperature variations from the center of the disk to the outer edge of the disk. Floating rotors are currently used to eliminate warpage, but floating rotors are expensive due to the number of parts and assembly costs.

Brake disks, whether rotary or stationary, must be capable of withstanding the heat created by the friction of brake pads rubbing against the brake disk. Since the heat generated by the brake pads is restricted to the outer perimeter, usually known as the "rim" or "rub area" of the disk, the outer perimeter of the disk expands during braking and contracts after braking. On the other hand, the inner section or "hub" of the disk is heated little if any during braking and, accordingly, does not expand or contract significantly. If a large disparity in temperature exists between the inner and outer areas of the disk, the heated rub area of the disk expands and contracts more than the hub, causing the disk to warp. If the caliper is a fixed mount caliper, as opposed to a slide mount caliper, a warping disk pushes on the pads and pistons on one side of the disk with a resultant loss of braking efficiency.

In U.S. Pat. No. 3,621,945, issued Nov. 23, 1971 and entitled "Disc Brakes," carbon friction disks for aircraft brakes are provided with scalloped perimeters for coaction with driving or restraining elements having similar scalloped perimeters. Both sets of scallops have flat contact surfaces disposed at an angle which optimizes the distribution of force on the friction disk and reduces or eliminates the transfer of heat from the outer rim to the inner rim or hub. In U.S. Pat. No. 3,850,267, issued Nov. 26, 1974 and entitled "Heat Collector And Support For Disc Brakes," a heat-collector shoe is arranged in a guide support which permits movement of the heat-collector shoe perpendicularly to the rotating member. The '267 patent states that the heat-collector shoe and the rotating member can be improved by providing the contact surface of the heat-collector shoe with shallow grooves and the circulation of cooling fluid through internal conduits in the collector shoe body. In U.S. Pat. No. 4,077,501, issued Mar. 7, 1978 and entitled "Disc for Disc Brake Unit," slots are provided in the brake segments which allow for radial expansion and contraction, thereby eliminating cracking by thermal expansion and contraction of the disk.

U.S. Pat. No. 3,435,924, issued Mar. 13, 1967 and entitled "Disk-Brake System with Floating Disk," discloses a floating brake disk having arcuate slots formed in the area between the rub area and the hub which are designed to extend the heat transfer path between the rub area and the hub so that heat is dissipated before the hub can distort. The slots are not designed to accommodate radial expansion and contraction of the rub area relative to the hub and, hence, do not prevent disk warpage.

U.S. Pat. No. 3,301,356, issued Feb. 11, 1965 and entitled "Slotted Brake Disc," discloses a brake disk having slots in its rub area which are designed to relieve biaxial stresses in the rub area. No structures are provided between the rub area and the hub to accommodate radial expansion and contraction of the rub area relative to the hub.

In view of the foregoing, it would be desirable to provide a brake disk, particularly of the type stamped from a nonductile material such as stainless steel, which accommodates radial expansion and contraction of the outer portion of the disk so as to reduce the tendency of the disk to warp, crack, or fracture.

It would also be desirable to reduce the tendency of the disk to warp by allowing the outer annular portion to expand when heated during braking and to contact again after braking. Without this flexibility, the disk may warp after it is heated and then cooled.

SUMMARY OF THE INVENTION

The present invention provides a brake disk having an inner annular portion or hub area and an outer annular portion or rub area that interconnected by a number of spaced arms. The arms can be formed (e.g. stamped) in a number of configurations whereby the stress in the disk caused by the heat generated in the outer annular portion by rubbing contact with the brake pads is relieved by the expansion and contraction of the arms as well as by arm deflection, thus preventing warping of the disk. The present invention also provides a braking system which incorporates such a disk and a method of braking such a disk.

Features and advantages of the invention will become apparent to those skilled in the art upon review of the following drawings, the detailed description and the appended claims.

BRIEF DESCRIPTION OF THE DRAWINGS

Preferred exemplary embodiments of the invention are illustrated in the accompanying drawings, in which like reference numerals represent like parts throughout and in which.

Before explaining embodiments invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 1:
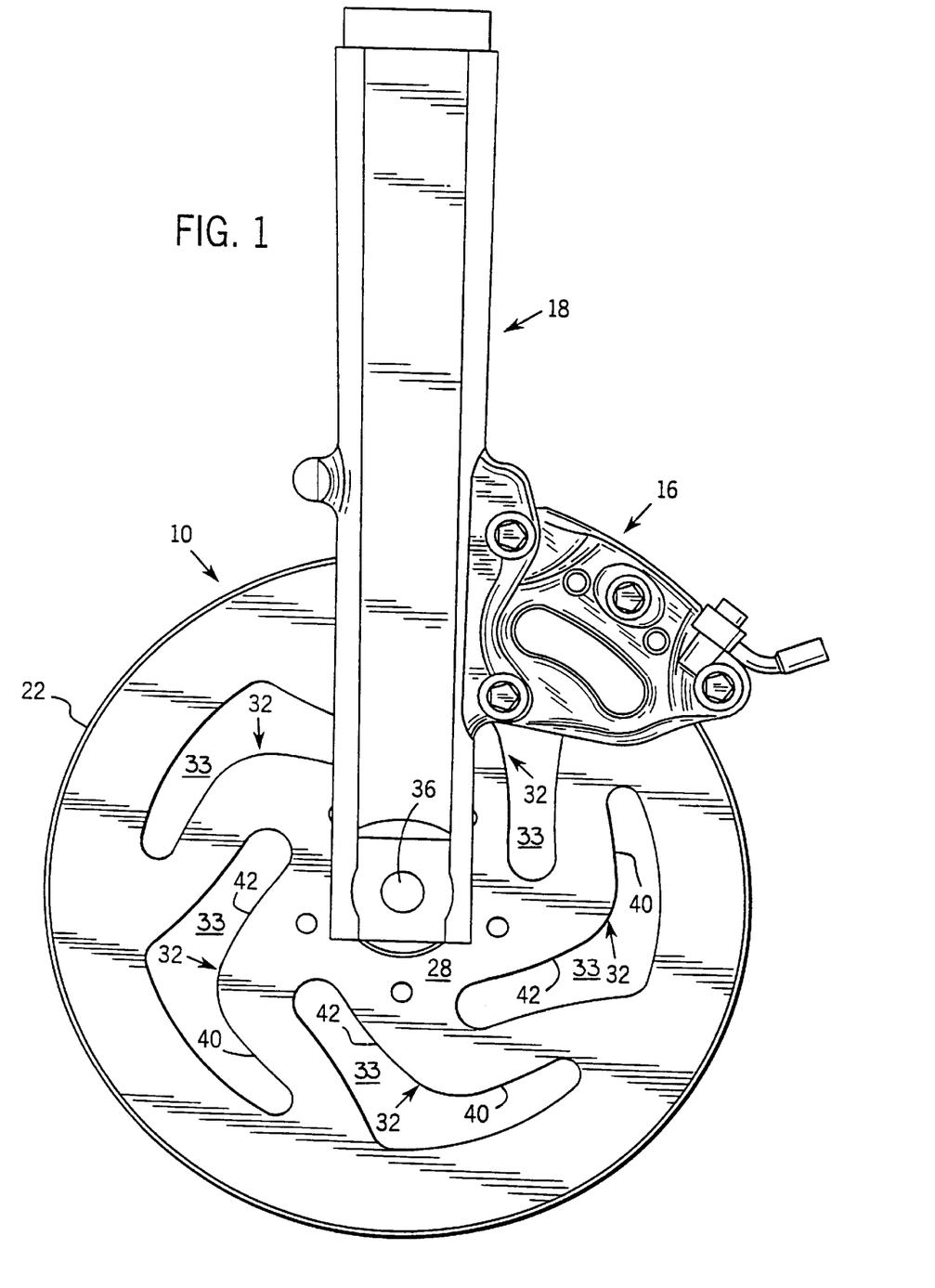
FIG. 1 is a side elevation view of a brake disk mounted on the fork of a motorcycle with a brake caliper assembly mounted on the fork in a position to engage the outer perimeter of the brake disk.
Figure 4:
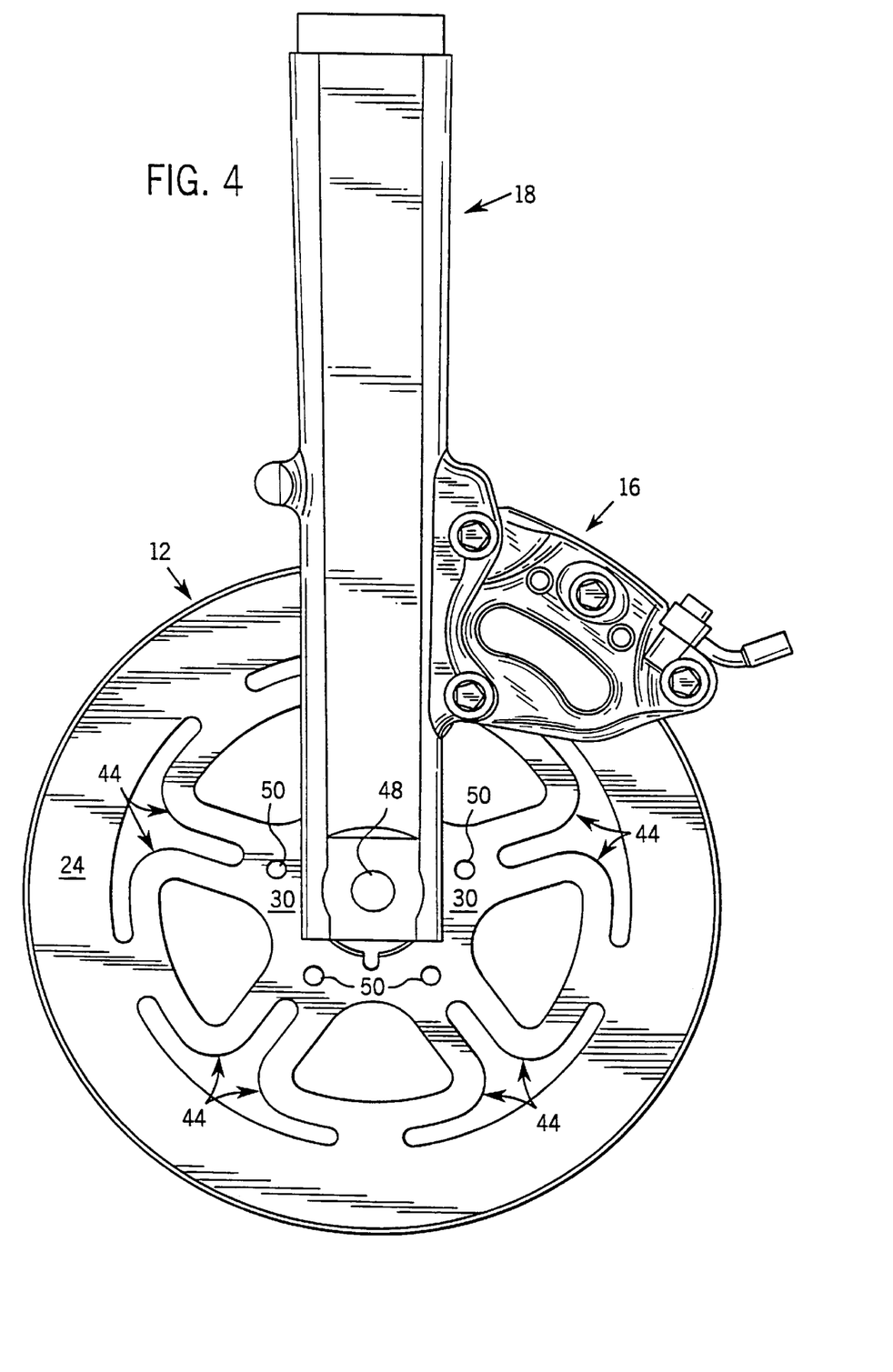
FIG. 4 is a view similar to FIG. 1 showing a brake disk of a second embodiment of the invention mounted on the fork with a brake caliper mounted on the fork in a position to engage the outer rim of the disk.
Figure 5:
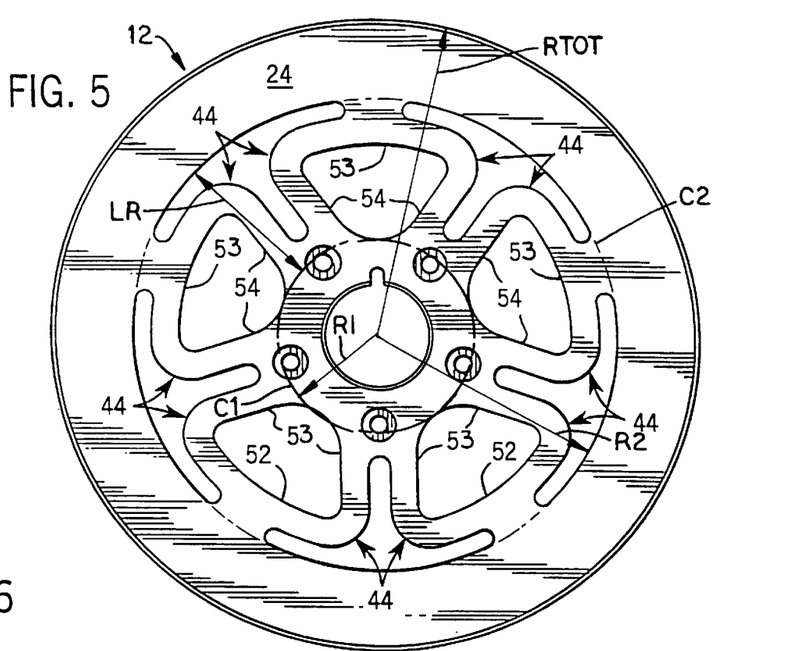
FIG. 5 is a front side elevation view of the disk shown in FIG. 4, with the outer rim connected to the inner rim or hub by triangularly shaped arms.
Figure 6:
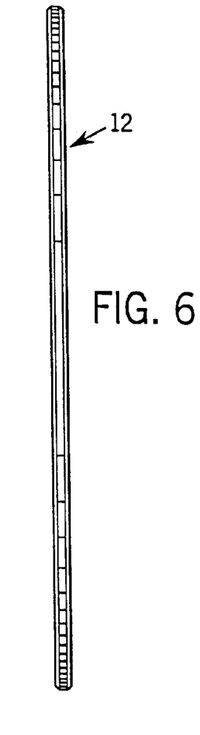
FIG. 6 is an end view of the disk of FIGS. 4 and 5.
Figure 7:
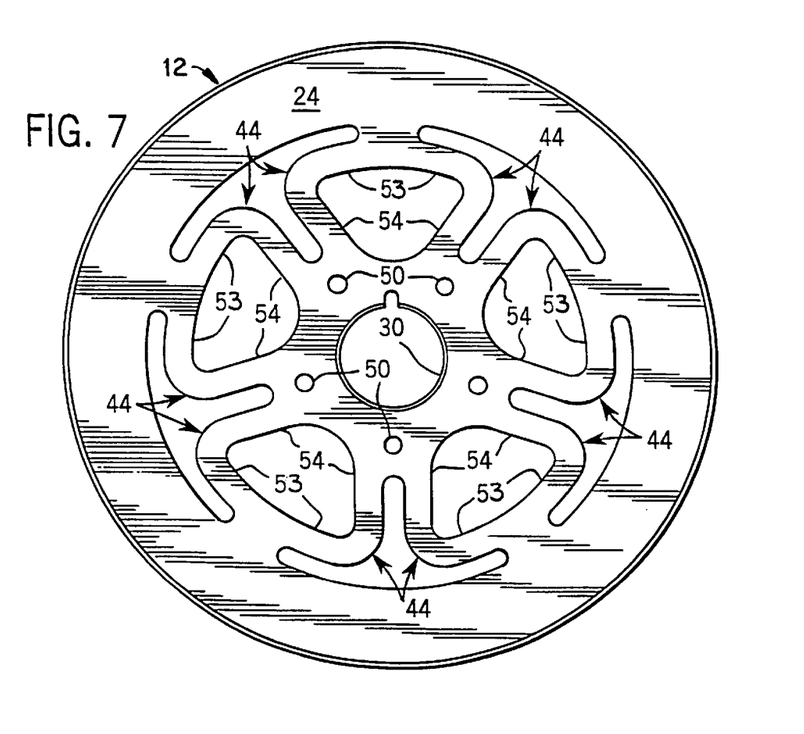
FIG. 7 is a side elevation view of the back side of the disk of FIGS. 4–6.

FIGS. 1 and 4 show brake disks 10 and 12 of first and second embodiments of the invention mounted for rotation on a fork 18 of a front wheel of a motorcycle. Each brake disks 10 or 12 has an outer annular portion 22 or 24 that is braked by a caliper assembly 16 mounted on the fork 18 in a position to straddle the outer annular portion 22 or 24 of the disk 10 or 12. The disks 10 and 12 are designed to permit expansion and contraction of the outer annular portion 22 or 24 radially toward a hub or inner annular portion 28 or 30 without warping.

Figures 2, 3:
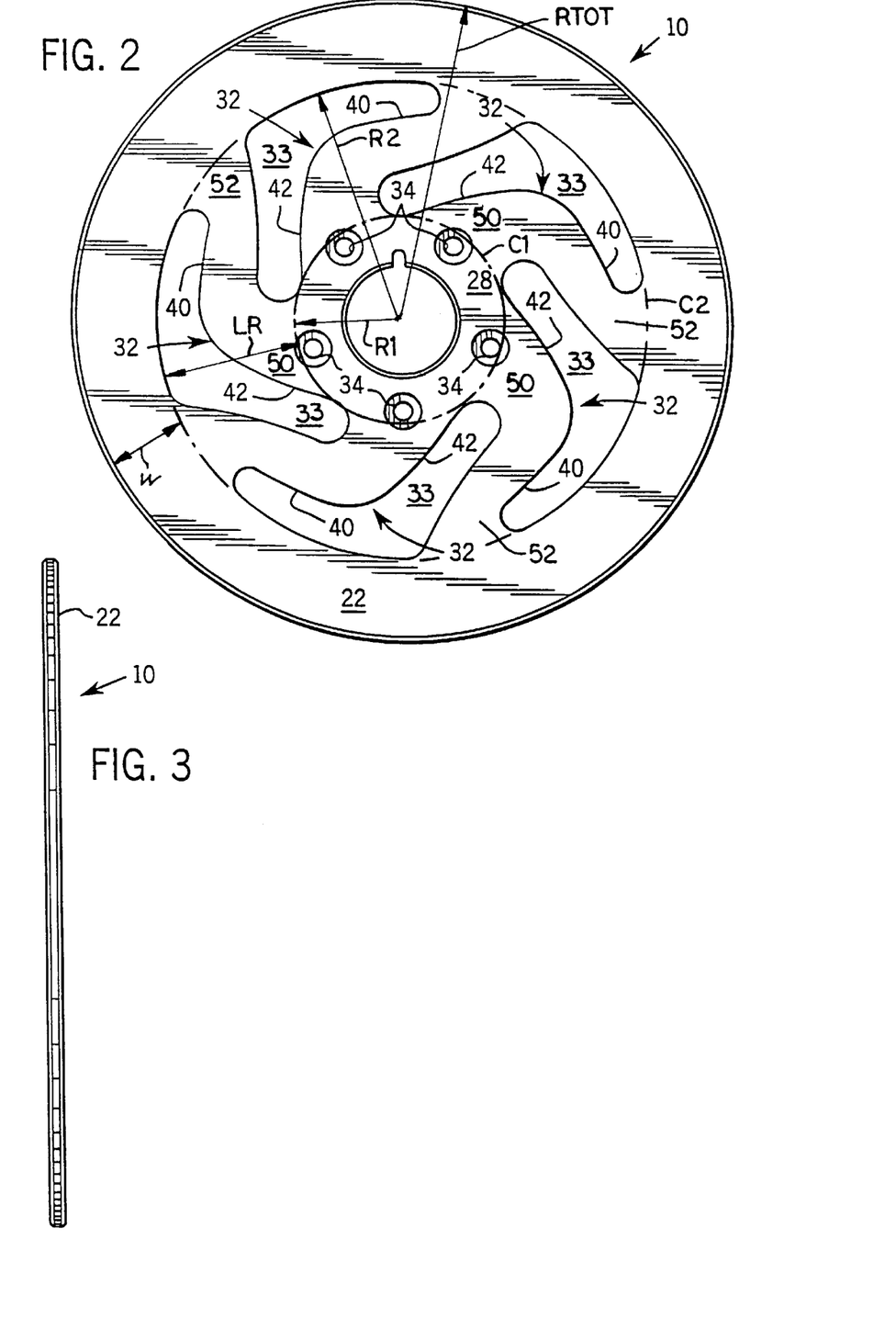
FIG. 2 is a front side elevation view of a brake disk having L-shaped radial arms interconnecting the outer rim of the disk, with the inner rim or hub of the disk which is mounted on the fork.
FIG. 3 is an end view of the disk of FIGS. 1 and 2.

In this regard, and referring initially to FIGS. 1, 2, and 3, the disk 10 of the first embodiment includes the outer annular portion 22, the inner annular portion 28, and a number of arms 32 formed between the outer annular portion 22 and the inner annular portion 28. The inner annular portion 28 is designed to be mounted on a wheel hub 36 and secured thereto by a number of bolts (not shown) mounted in openings 34. The arms 32 are arranged to deflect radially to accommodate expansion and contraction of the outer annular portion 22. "Radially," as used herein, means that the arms deflect within the plane of the disk 10 to permit the radial distance LR between annular portions 22 and 28 to change. Those skilled in the art would recognize that, because the arms 32 do not extend purely radially, not all components of arm deflection are in the radial direction.

In order to accommodate radial expansion and contraction of the outer annular portion 22, each of the arms 32 preferably 1) extends from the inner annular portion 28 towards the outer annular portion 22 nonradially, i.e., at an acute angle from a tangent to a circle C1 circumscribing an outer peripheral edge of the inner annular portion 28, and 2) extends from the outer annular portion 22 towards the inner annular portion 28 nonradially, i.e., at an acute angle from a tangent to a circle C2 circumscribing an inner peripheral edge of the outer annular portion 22. Different arm curvatures are possible, so long as at least a portions of the arms 32 have a non-radial component so as to be deflectable upon radial expansion and contraction of the outer annular portion 22. In addition, both the inner and outer ends 50 and 52 of each arm 32 preferably are enlarged relative to a radially intermediate portion of the arm. ("Enlarged" as used herein does not mean that the inner and outer ends 50 and 52 must be wider than the entire remainder of the arms. The ends of an arm are "enlarged" relative to an intermediate portion, even if part of the intermediate portion is wider than the ends, so long as another part of the intermediate portion is narrower than the ends).

The preferred size and shape of the arms will vary from application-to-application, depending on several operational and dimensional factors. For instance, those skilled in the art know that in most brake designs, the proportions of the areas of 1) the rub area or outer annular portion, 2) the hub or inner annular portion, and 3) the entire brake disk are preset depending on the intended application. More specifically, and referring to FIG. 3 by way of example, the disk 10 has an overall radius RTOT, the outer peripheral edge of the inner annular portion 28 has a radius R1, and the inner peripheral edge of the outer annular portion 22 has a radius R2. The width W of the outer annular portion or rub area 22 is often preset to mate with a particular caliper. The length R2 of the radius of the inner peripheral edge of the outer annular area 22 therefore is predetermined as a function of 1) the preset disk radius RTOT and 2) the preset width W of outer annular portion 22. The radius R1 is dependent upon the size of the wheel hub to which the inner portion 28 is to be attached. As a result, the radial length LR of each of the arms 32, which equals R2 minus R1, is preset and is dependent on the ratio of R1 to R2. In high torque applications, such as bicycles and motorcycles, the ratio of R1 to R2 is relatively low because a relatively long moment arm is required to provide the required braking torque upon the imposition of a given braking force on the rub area. On the other hand, in low torque applications, such as snowmobiles, the ratio of R1 to R2 is relatively high because the moment arm of the disk need not be as long.

Those skilled in the art also know that the strength of a disk component such as a leg 32 increases as a squared function of its height (or thickness in the circumferential direction as opposed to the axial direction). Therefore, more massive legs 32 are desired in high torque applications than in low torque applications. "Massive" in this context refers to the aggregate mass of the legs and the resultant aggregate strength. Hence, a design can be modified to accommodate greater torque by increasing the number of arms, increasing the height of each arm, or a combination of both.

The preferred arm shape is also dependent upon the thermal load to be encountered by the disk. Arms designed for high thermal load applications (i.e, applications generating large amounts of heat during braking), such as snowmobiles, must accommodate relatively large magnitudes of outer annular portion radial expansion and contraction and, accordingly, should have a relatively long circumferential length to accommodate relatively large magnitudes of arm deflection. Arms designed for low thermal load applications (i.e., applications generating lesser amounts of heat during braking), such as bicycles and motorcycles, need not accommodate as much outer annular portion radial expansion and contraction and, accordingly, can have a shorter circumferential length because they need not deflect as much. Therefore, generally speaking, the circumferential length of the arms increases with the amount of outer annular portion thermal expansion and contraction to be accommodated.

The arms 32 of the disk 10 of FIGS. 1–4 are in the form of L-shaped spokes, each having 1) a base section 42 extending outwardly from the inner end 50 of the arm 32, and 2) an arm section 40 extending generally inwardly from the outer end 52 of the arm to the base section 42. The disk 10 is designed for use with a motorcycle—recognized in the art as a high torque/medium thermal load application, and the arms 32 are configured accordingly. More specifically, because the disk 10 is for a high-torque application, R2 is relatively large and, accordingly, is much greater than R1. The radial length LR of the arms 32 therefore is relatively long and the arms 32 are also relatively large but are not particularly massive. In addition, because the disk 10 is configured for a medium-thermal application, the arms 32 need not extend a large circumferential length, but do need to extend a sufficient circumferential length to accommodate the non-negligible changes in LR resulting from heating and cooling of the outer annular portion 22. Spaces 33 are formed circumferentially between the arms 32. Because the arms 32 are not particularly massive, the combined volume of these circumferential spaces 33 is not substantially greater than the volume of the arms themselves. In addition, because the width W of the outer annular portion or rub area 22 is relatively small to accommodate the friction elements of the motorcycle brake caliper 16, LR is substantially greater than W.

In use, the heat generated in the outer annular portion 22 by the actuation of the brake caliper assembly 16 causes the outer annular portion 22 to expand with respect to the arms 32. The arms 32 deflect radially when the distance LR changes upon expansion and contraction of the outer annular portion 22 and the resultant change in length of the radius R2. This deflection prevents the disk 10 from warping. During arm deflection, the enlarged inner and outer ends 50 and 52 of the arms 32 and the resultant large radii and sweeping curves at the intersections between the arms and the inner and outer annular portion 28 and 22 assure that stresses in the arms 32 "flow" or are distributed relatively evenly through the arms. As a result, no one part of the arm is over-stressed upon arm deflection. Cracks and fractures therefore are prevented.

Referring to FIGS. 4 through 7, the arms of disk 12 of the second embodiment take the form at a number of arm sections 44 connected between the outer annular portion 24 and the inner annular portion 30. The inner annular portion 30 is designed to be mounted on the wheel hub 48 and is secured thereto by a number of bolts (not shown) mounted in openings 50. The arm sections 44 are in the form of rounded symmetrical triangles having a base 53 connected to the rim 24 and a pair of arms 54 connecting the base 53 to the hub 30. The arm sections 44 deflect to accommodate changes in the length LR upon outer annular portion expansion and contraction.

Figures 8, 10:
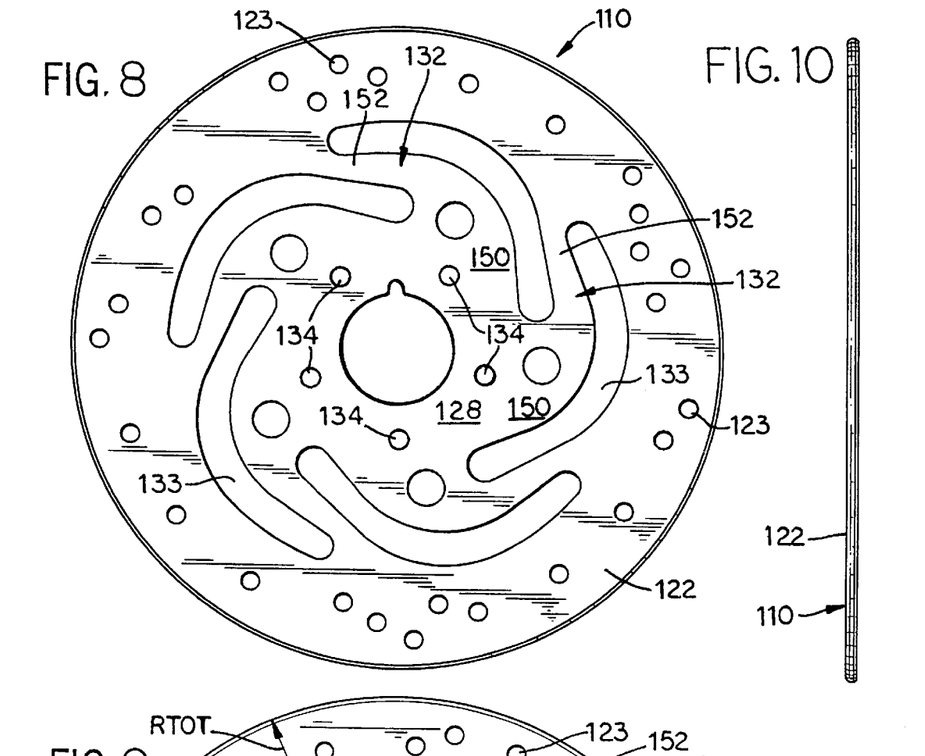
FIG. 8 is front side elevation view showing a brake disk of a third embodiment of the invention.
FIG. 10 is an end view of the disk of FIGS. 8 and 9.
Figure 9:
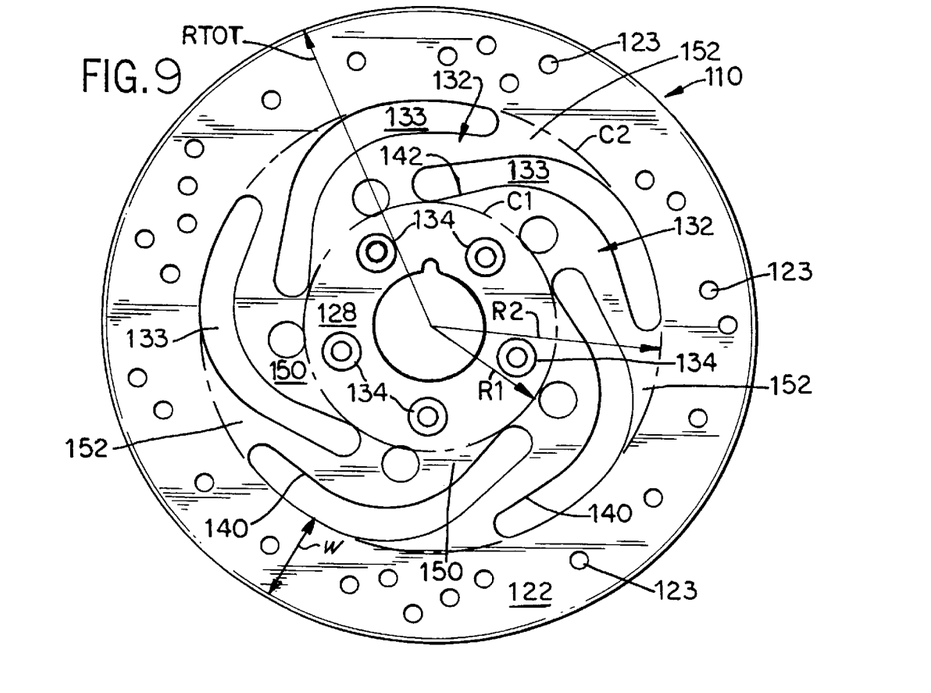
FIG. 9 is a rear side elevation view of the disk of FIG. 8.

Referring to FIGS. 8–10, a third embodiment of a disk 110 constructed in accordance with the present invention is illustrated. This disk 110 differs from the disk 10 of the first embodiment only in that the shapes of the arms have been modified to further reduce sharp turns or bends in the arms, thereby reducing stress upon thermal expansion of the rub area. Components of disk 110 corresponding to the disk 10 of the first embodiment are designated by the same reference numerals, incremented by 100. The disk 110 therefore includes a rub area or outer annular portion 122, a hub or inner annular portion 128, and a plurality of curved arms 132 extending radially and circumferentially from the outer peripheral edge of the inner annular portion 128 to the inner peripheral edge of the outer annular portion 122. The inner annular portion 128 of the disk 110 is configured to be mounted on a hub (not shown) by a number of bolts (also not shown) mounted in openings 134 in the inner annular portion 128. The outer annular portion 122 has a width W configured to accommodate a particular caliper design, leaving an inner peripheral edge radius of R2. A plurality of relatively small holes 123 are formed asymmetrically in the outer annular portion 122 for noise abatement purposes and for the purposes of cleaning debris from the friction surfaces of the mating brake pads or other friction elements.

In this embodiment, as in the prior embodiments, the arms 132 are relatively L-shaped. Each arm 132 has 1) inner and outer ends 150 and 152 each extending at an acute angle from a tangent to the associated circle C1 or C2, 2) a base 142, and 3) an outer portion 140. Each arm 132 also has a circumferential length which is significantly greater than its radial length LR. The radial length LR is longer, but not substantially longer, than the radius R1 of the outer peripheral edge of the inner annular portion 128, and is also substantially longer than the width W of the outer annular portion 122. Also as in the embodiment of FIGS. 1–3, the combined volume of the spaces 133 between the arms 132 is not substantially greater than the combined volume of the arms 132.

Figure 11:
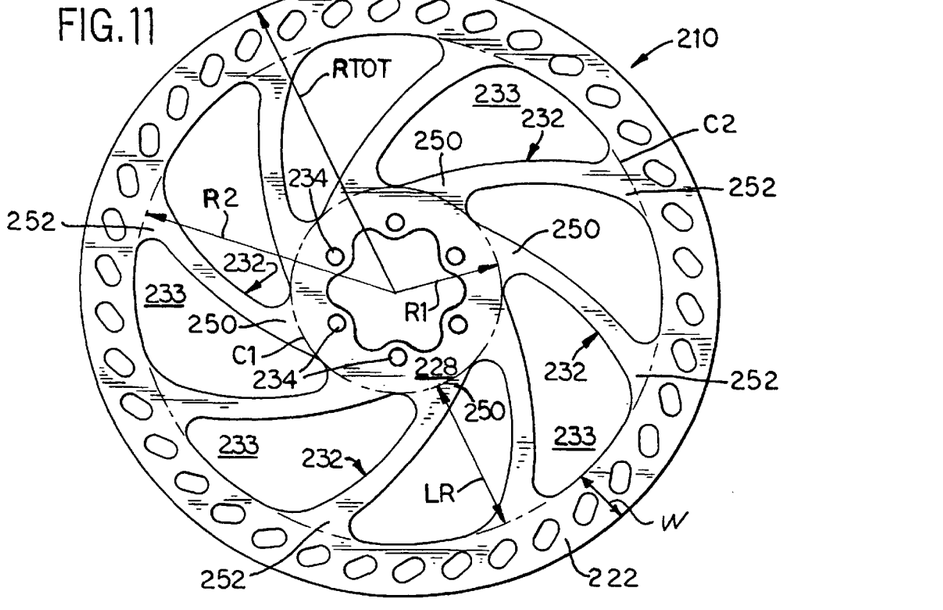
FIG. 11 is front side elevation view showing a brake disk of a fourth embodiment of the invention.
Figure 12:
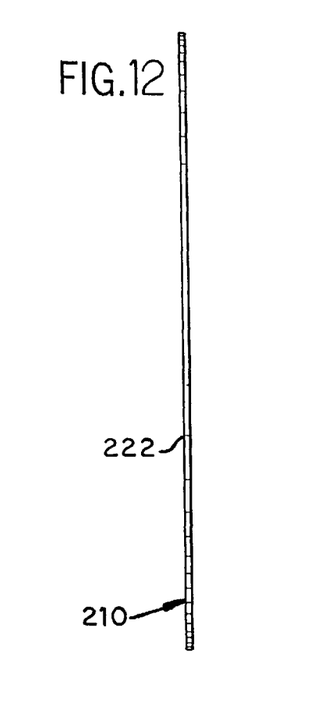
FIG. 12 is an end view of the disk of FIG. 11.

A more extreme example of a disk 210 usable in a very high torque, very low thermal application is illustrated in FIGS. 11 and 12. The disk 210 includes a rub area or outer annular portion 222, a hub or inner annular portion 228, and a plurality of arms 232 extending from the inner annular portion 228 to the outer annular portion 222. Also as in the previous embodiments, the inner annular portion 228 has a plurality of holes 234 for affixing the disk 210 to a hub (not shown) via suitable fasteners (also not shown). However, in this embodiment, the arms 232 are relatively long and numerous when compared to the arms of the previous embodiments to reflect their use in a high torque environment. In fact, the radial length LR of each arm 232 is at least double the radius R1 of the outer peripheral edge of the inner portion 228. This radial length LR is also much longer than the width W of the outer annular portion 222.

The circumferential length of each arm 232 relative to its radial length is very small, reflecting the disk's intended use in an application subjecting it to low thermal loads. In fact, each arm's circumferential length is less than its radial length LR. As a result of the small circumferential length and the large radial length, the angles at which the inner and outer ends 250 and 252 extend from the tangents to the circles C1 and C2 circumscribing the inner and outer annular portions 228 and 232, though still acute, is higher than in the previous embodiments and substantially greater than 45° and preferably more than 60°. The combined volume of the circumferential spaces 233 between the arms 232 is much greater than the combined volume of the arms themselves.

Figures 13, 14:
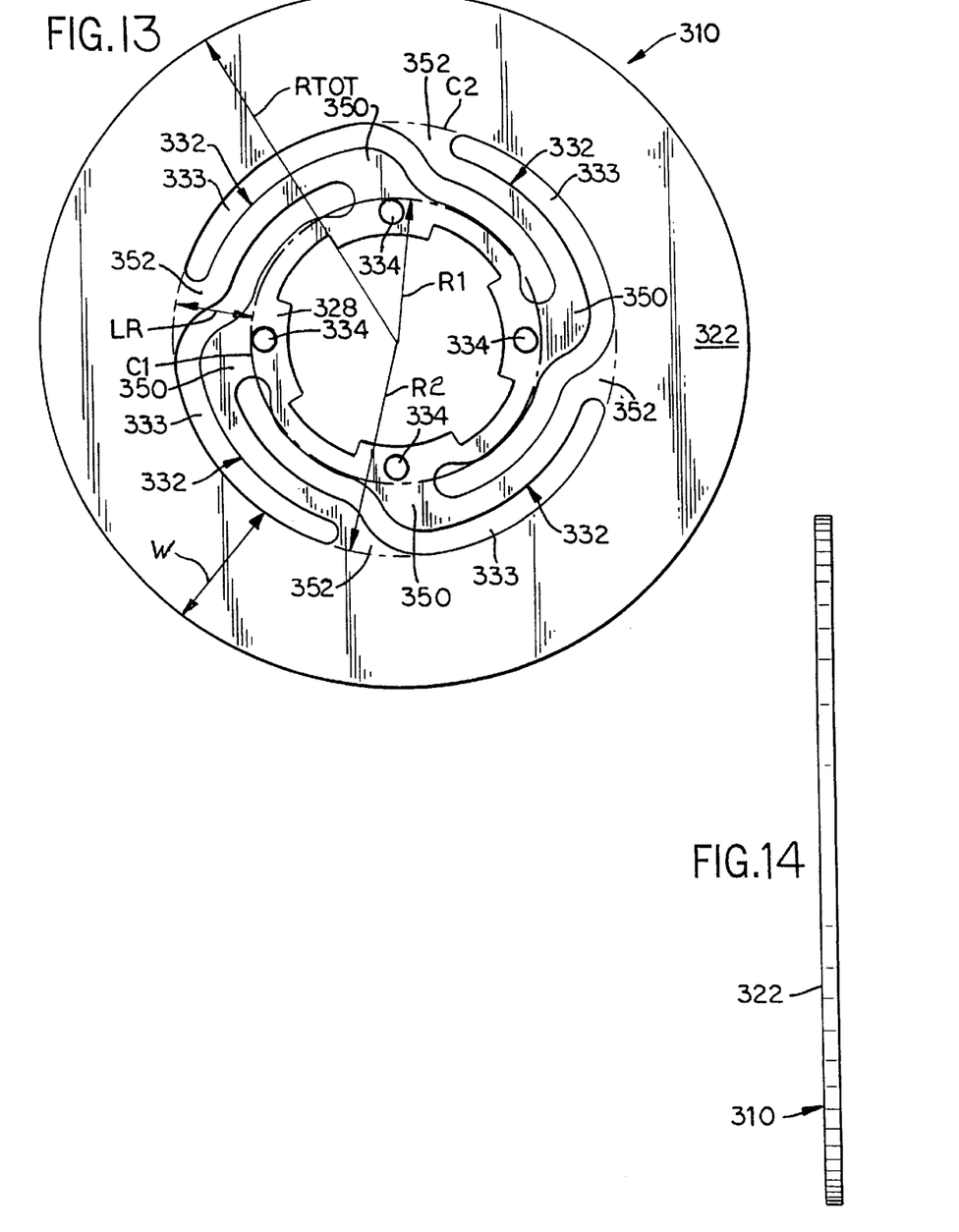
FIG. 13 is front side elevation view showing a brake disk of a fifth embodiment of the invention.
FIG. 14 is an end view of the disk of FIG. 13.

Referring now to FIGS. 13 and 14, a fifth embodiment of a one-piece brake disk 310 constructed in accordance with the present invention is illustrated that is applicable to low torque/high thermal load environments. The disk 310, like the disks of the previous embodiments, includes an outer annular portion 322, an inner annular portion 328, and a plurality of arms 332 extending radially and circumferentially from the inner annular portion 328 to the outer annular portion 322. Typical of low torque applications, the disk 310 has a relatively small overall radius RTOT in relation to the radius R1 of the inner annular portion 328. The ratio of the radial length LR of the arms 332 to the radius R1 of the inner annular portion 328 therefore is reduced when compared to the prior embodiments. The radial length LR of the arms 332 is reduced further when compared to the previous embodiments because the disk 310 has a relatively large rub area (reflected by the relatively high ratio of the width W of the outer annular portion 322 to the overall radius RTOT of the disk 310). As a result of these factors, the radial length LR of each of the arms 332 is not substantially longer than the radius R1 of the outer peripheral edge of the inner annular portion 322.

The high thermal load handling capability of the disk 310 is reflected by the fact that each of the arms 332 has a long circumferential length in order to accommodate the relatively high magnitude of radial movement of the inner peripheral edge of the outer annular portion 322 occurring upon expansion and contraction of the outer annular portion 322 and the resultant large changes in the length LR. In fact, each of the arms 332 is over twice as long circumferentially as it is radially.

Thus, it should be apparent that there has been provided in accordance with the present invention a brake disk that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A one-piece disk for use in a vehicle braking system, said one-piece disk comprising:
   an inner annular portion which is attachable to a wheel hub by fasteners;
   an outer annular portion which is formed concentric with said inner annular portion, said outer annular portion including a first side having a first surface engageable by a first friction element during braking and a second side having a second surface engageable by a second friction element during braking, wherein said inner annular portion is not engageable by said first and second friction elements; and
   a plurality of offset, generally L-shaped arms which are formed between said inner and outer annular portions, each of said arms having an inner end which extends outwardly from an outer peripheral edge of said inner annular portion and an outer end which extends inwardly from an inner peripheral edge of said outer annular portion, said outer end being spaced radially and circumferentially from said inner end, wherein
      at least one of said inner end and said outer end of each of said arms extends nonradially from a circle circumscribing an associated one of said outer peripheral edge of said inner annular portion and said inner peripheral edge of said outer annular portion, and wherein
      a change in shape of said outer annular portion in response to a change in temperature of said outer annular portion causes said arms to deflect at least generally radially in relation to said inner annular portion.

2. The one-piece disk of claim 1, wherein said outer peripheral edge of said inner annular portion has a radius R1, said inner peripheral edge of said outer annular portion has a radius R2, and each of said arms has a radial length LR of R2 minus R1.

3. The one-piece disk of claim 2, wherein LR is substantially greater than R1.

4. The one-piece disk of claim 2, wherein each of said arms has a circumferential length which is substantially greater than LR.

5. The one-piece disk of claim 2, wherein said outer annular portion has a radial width W, and wherein LR is greater than W.

6. The one-piece disk of claim 1, wherein circumferential spaces are formed between said arms and a combined volume of all of said circumferential spaces is not substantially more than a combined volume of all of said arms.

7. The one-piece disk of claim 1, wherein both of said inner and outer ends of each of said arms extend nonradially from the associated one of said inner annular portion and said outer annular portion.

8. The one-piece disk of claim 7, wherein each of said arms lacks any portion that extends purely radially.

9. The one-piece disk of claim 1, wherein each of said arms lacks any portion that extends purely radially.

10. The one-piece disk of claim 1, wherein each of said inner and outer ends of each of said arms is enlarged relative to an intermediate portion connecting inner and outer ends.

11. A one-piece disk for use in a vehicle braking system, the one-piece disk comprising:
    an inner annular portion which is attachable to a wheel hub by fasteners;
    an outer annular portion which is formed concentric with said inner annular portion, said outer annular portion including a first side having a first surface engageable by a first friction element during braking and a second side having a second surface engageable by a second friction element during braking, wherein said inner annular portion is not engageable by said first and second friction elements; and
    a plurality of offset, generally L-shaped, curved arms which are formed between said inner and outer annular portions, each of said arms having an inner end which extends outwardly from an outer peripheral edge of said inner annular portion and an outer end which extends inwardly from an inner peripheral edge of said outer annular portion, said outer end being spaced radially and circumferentially from said inner end, wherein
       said outer end of each of said arms 1) extends nonradially from said outer annular portion towards said inner annular portion and 2) is enlarged relative to a radially intermediate portion of said arm, wherein
       said inner end of each of said arms 1) extends nonradially from said inner annular portion towards said outer annular portion and 2) is enlarged relative to said radially intermediate portion of said arm, and wherein
       a change in shape of said outer annular portion in response to heating of said outer annular portion causes said arms to deflect at least generally radially in relation to said inner annular portion.

12. A one-piece disk for use in a vehicle braking system, said one-piece disk comprising:
    an inner annular portion which is attachable to a wheel hub by fasteners;
    an outer annular portion which is formed concentric with said inner annular portion, said outer annular portion including a first side including a first surface engageable by a first friction element during braking and a second side having a second surface engageable by a second friction element during braking, wherein said inner annular portion is not engageable by said first and second friction elements; and a plurality of offset, generally L-shaped arms which are formed between said inner and outer annular portions, each of said arms having an inner end which extends outwardly at a first acute angle from an outer peripheral edge of said inner annular portion and an outer end which extends inwardly at a second acute angle from an inner peripheral edge of said outer annular portion, said outer end being spaced radially and circumferentially from said inner end.

13. The one-piece disk of claim 12, wherein said outer annular portion has a radial width W, said outer peripheral edge of said inner annular portion has a radius R1, said inner peripheral edge of said outer annular portion has a radius R2, and each of said arms has a radial length LR of R2 minus R1, LR being greater than R1.

14. The one-piece disk of claim 12, wherein said outer annular portion has a radial width W, said outer peripheral edge of said inner annular portion has a radius R1, said inner peripheral edge of said outer annular portion has a radius R2, and each of said arms has a radial length LR of R2 minus R1, and wherein each of said arms has a circumferential length which is greater than LR.

15. The one-piece disk of claim 12, wherein each of said arms has a circumferential length which is at least twice LR.

16. The one-piece disk of claim 12, wherein each of said inner and outer ends of each of said arms is enlarged relative to an intermediate portion connecting said inner and outer ends.

17. The one-piece disk of claim 12, wherein said outer annular portion has a radial width W, said outer peripheral edge of said inner annular portion has a radius R1, said inner peripheral edge of said outer annular portion has a radius R2, and each of said arms has a radial length LR of R2 minus R1, and wherein LR is not substantially less than R1.

18. A method comprising:

braking a wheel by engaging first and second opposed axial surfaces of a one-piece brake disk with friction elements, said brake disk including 1) an inner annular portion affixed to a rigid hub of the wheel, 2) an outer annular portion, and 3) , generally L-shaped curved arms which extend radially and circumferentially between said inner annular portion and said outer annular portion, wherein said inner annular portion is not engaged by said friction elements;

generating heat during the braking step, thereby heating said outer annular portion of said disk and causing said outer annular portion to expand radially relative to said inner annular portion;

permitting said arms to elastically deflect without failure as a result of the expansion of said outer annular portion relative to said inner annular portion, thereby preventing warpage of said disk; then permitting said arms to return to return to initial positions thereof upon cooling and consequent contraction of said outer annular portion.

19. The method of claim 18, wherein each of said arms has inner and outer ends, and wherein at least one of said inner end and said outer end of each of said arms extends nonradially from a circle circumscribing an associated one of an outer peripheral edge of said inner annular portion and an inner peripheral edge of said outer annular portion.

20. The method of claim 19, wherein inner and outer ends of each of said arms are enlarged relative to an intermediate portion connecting said inner and outer ends.

21. The method of claim 18, wherein each of said arms lacks any portion that extends purely radially.

22. The method of claim 18, wherein an outer peripheral edge of said inner annular portion has a radius R1, an inner peripheral edge of said outer annular portion has a second radius R2, and each of said arms has a radial length LR of R2 minus R1.

23. The method of claim 22, wherein LR is substantially greater than R1.

24. The method of claim 22, wherein each of said arms has a circumferential length which is greater than LR.

25. The method of claim 22, wherein said outer annular portion has a radial width W, and wherein LR is greater than W.

26. A braking system for a wheel of a vehicle, the braking system comprising:

a brake caliper including first and second friction elements; and a one-piece disk for use in a vehicle braking system, said one-piece disk including an inner annular portion which is attachable to a wheel hub by fasteners;

an outer annular portion which is formed concentric with said inner annular portion, said outer annular portion including a first side having a first surface engageable by a first friction element during braking and a second side having a second surface engageable by a second friction element during braking, wherein said inner annular portion is not engageable by said first and second friction elements; and a plurality of offset, generally L-shaped arms which are formed between said inner and outer annular portions, each of said arms having an inner end which extends outwardly from an outer peripheral edge of said inner annular portion and an outer end which extends inwardly from an inner peripheral edge of said outer annular portion, said outer end being spaced radially and circumferentially from said inner end, wherein at least one of said inner end and said outer end of each of said arms extends nonradially from a circle circumscribing an associated one of said outer peripheral edge of said inner annular portion and said inner peripheral edge of said outer annular portion, and wherein a change in shape of said outer annular portion in response to a change in temperature of said outer annular portion causes said arms to deflect at least generally radially in relation to said inner annular portion.

* * * * *